United States Patent [19]

Bossack

[11] Patent Number: 4,832,306
[45] Date of Patent: May 23, 1989

[54] MOTOR MOUNTING BRACKET

[75] Inventor: Thomas J. Bossack, Candor, N.Y.

[73] Assignee: NCR Corporation, Dayton, Ohio

[21] Appl. No.: 174,731

[22] Filed: Mar. 28, 1988

[51] Int. Cl.$^4$ .............................................. F16M 3/00
[52] U.S. Cl. .................................................... 248/674
[58] Field of Search ................... 248/674, 680, 422.2, 248/221.4, 231.2, 231.8; 310/91

[56] References Cited

U.S. PATENT DOCUMENTS

| | | |
|---|---|---|
| 3,941,339 | 3/1976 | McCarty . |
| 4,155,020 | 5/1979 | Skare . |
| 4,155,528 | 5/1979 | Dawson .............................. 248/674 |
| 4,410,160 | 10/1983 | Alperin et al. ....................... 248/674 |
| 4,420,136 | 12/1983 | Lau . |
| 4,531,700 | 7/1985 | Robinson ......................... 248/674 X |
| 4,625,134 | 11/1986 | Weaver .............................. 310/91 X |
| 4,657,478 | 4/1987 | LaZebnik et al. . |
| 4,676,473 | 6/1987 | Giles . |
| 4,780,007 | 10/1988 | Weeks et al. .......................... 400/56 |

Primary Examiner—Ramon O. Ramirez
Attorney, Agent, or Firm—Wilbert Hawk, Jr.; Albert L. Sessler, Jr.; George J. Muckenthaler

[57] ABSTRACT

The motor mounting bracket is of one piece construction and includes an enclosure formed to contain the mounting flange of the motor and to substantially enclose the motor. The bracket has oppositely positioned spring-like lugs with tips for receiving and securing the mounting flange, and the mounting bracket has a pair of pilot studs matching apertures in the mounting flange for securing the motor flange against movement. The mounting bracket enables a motor to be secured without use of separate screws, bolts, nuts and like parts.

25 Claims, 4 Drawing Sheets

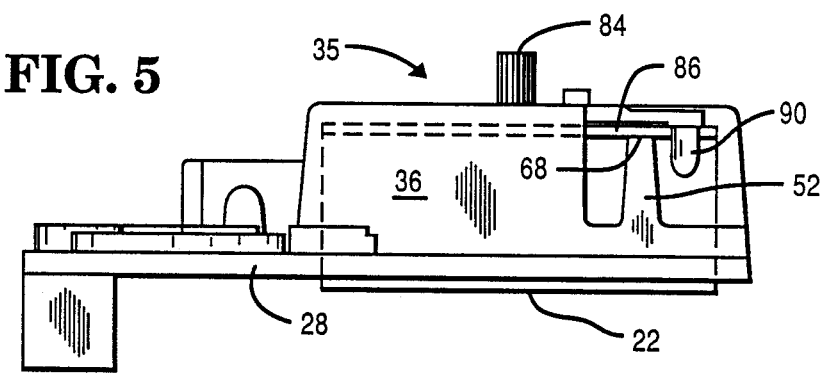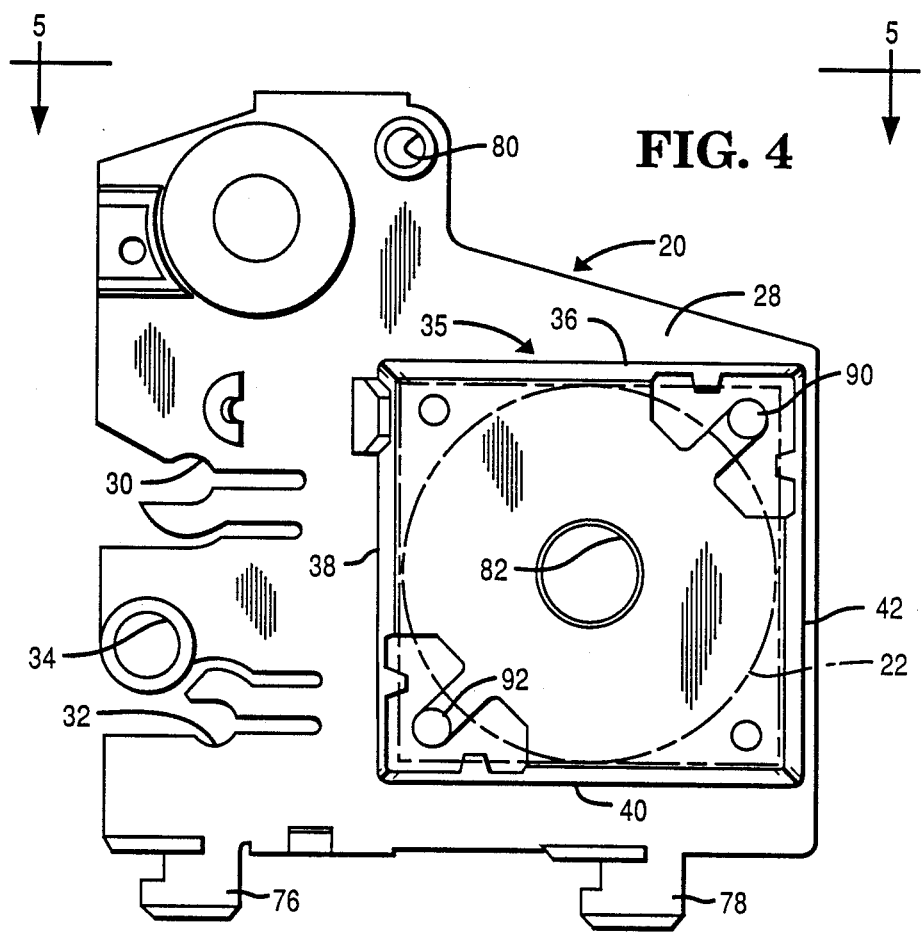

MOTOR MOUNTING BRACKET

BACKGROUND OF THE INVENTION

In the field of printing, the most common type printer has been the printer which impacts against record media that is caused to be moved past a printing line or line of printing. As is well-known, the impact printing operation depends upon the movement of impact members, such as print hammers or wires or the like, which are typically moved by means of an electromechanical drive system and which system enables precise control of the impact members.

In the field of dot matrix printers, it has been quite common to provide a print head which has included therein a plurality of print wire actuators or solenoids arranged or grouped in a manner to drive the respective print wires a very short, precise distance from a rest or non-printing position to an impact or printing position. The print wires are generally either secured to or engaged by the solenoid plunger or armature which is caused to be moved such precise distance when the solenoid coil is energized and wherein the plunger or armature normally operates against the action of a return spring.

It has also been quite common to provide an arrangement or grouping of such solenoids in a circular configuration to take advantage of reduced space available in the manner of locating the print wires in that specific area between the solenoids and the front tip of the print head adjacent the record media. In this respect, the actuating ends of the print wires are positioned in accordance with the circular arrangement and the operating or working ends of the print wires are closely spaced in vertically-aligned manner adjacent the record media. The availability of narrow or compact actuators permits a narrower or smaller print head to be used and thereby reduces the width of the printer because of the reduced clearance at the ends of the print line. The print head can also be made shorter because the narrow actuators can be placed in side-by-side manner closer to the record media for a given amount of wire curvature.

In the wire matrix printer which is utilized for receipt and journal printing operation, the print head structure may e a multiple element type and horizontally disposed with the wire elements aligned in a vertical line and supported on a print head carriage which is caused to be moved or driven in a horizontal direction for printing in line manner across the receipt or journal paper and wherein the drive elements or transducers may be positioned in a circular configuration with the respective wires leading to the front tip of the print head. In the wire matrix printer which is utilized for business forms or like record media printing operation, the print head may be oriented in a manner wherein the nose is pointed downward for printing on the form, slip or like media while the carriage and print head are moved above and across the form or media in the horizontal direction.

In the dot matrix printer, there is a requirement for one or more small electric motors to drive certain parts of the printer. A small motor is used to drive the print head carriage in reciprocating manner in the printer that includes a stationary platen and a movable print head. A second motor is used to drive the paper such as a receipt, a slip or a journal at the end of the printing operation and which paper drive is usually performed at the ends of the lines of printing.

The demands of certain printing operations place a high duty cycle on the drive motor and it is essential that the motor be secured and contained in an appropriate manner because the motor is relied upon for long lasting operation which may involve either continuous or intermittent duty.

The use of screws, bolts, nuts and the like is well-known for securing the motor mounting flange to a side frame of the printer. Other fastening members have included self-tapping screws, for example, in plastic frames or serrated washers engaging the surface of metal frames. It is, of course, realized that the use of a smaller number of parts enables simpler and less costly products while maintaining quality of such products.

Representative documentation in the field of motor mountings includes U.S. Pat. No. 3,941,339, issued to W. J. McCarty on Mar. 2, 1976, which discloses a motor mounting arrangement wherein a wall member has a passageway for the motor shaft and has aligned openings for motor support elements. A mounting member has a body portion with a collar projecting in the passageway along with sleeves in the openings. Retaining means is provided to prevent axial movement of the motor and mounting member relative to the wall member.

U.S. Pat. No. 4,155,020, issued to T. C. Skare on May 15, 1979, discloses a snap-fit fastening system for attaching a member to an electric motor wherein the stator through-bolts each include an extension with a lip thereon spaced from the head of the bolt. A shoulder orients the bolts in one pattern and the member has a plurality of slots to receive the extensions with the slots being arranged in another pattern offset from the first pattern to provide a snap-fit to lock the member.

U.S. Pat. No. 4,155,528, issued to D. C. Dawson on May 22, 1979, discloses an electric motor mounting device that includes an adjustable band clamp and a plurality of mounting legs with an end area of each leg closely captured between the clamp and the motor. The other end area of each leg has means for fixedly mounting the leg to associated structure.

U.S. Pat. No. 4,410,160, issued to M. Alperin et al. on Oct. 18, 1983, discloses an arrangement for attaching a fan unit flush with a ceiling and which includes first and second bowl shaped circular members wherein one member is attached to a ceiling box and the other member has a plurality of slots to receive support rods of the one bowl member.

U.S. Pat. No. 4,420,136 issued to D. W. Lau on Dec. 13, 1983, discloses a mounting assembly for a fan motor which includes a clip or brace secured to the motor. The motor has mounting arms with a first section of a looped base portion fixed to the clip and a second section fixed to an adjacent mounting arm.

U.S. Pat. No. 4,531,700, issued to C. W. Robinson on July 30, 1985, discloses an electric motor mounting arrangement wherein the motor has a mounting flange with a pair of diametrically opposed mounting ears with openings therein. A pair of motor support members is provided on a frame and includes cam projections aligned with the openings. The mounting flange is rotated until the projections snap into the openings.

U.S. Pat. No. 4,657,478, issued to R. H. LaZebnik et al. on Apr. 14, 1987, discloses a shroud for a belt driven fan that includes a planar apron and a tubular throat. Linear support members that are attached to the apron support an electric motor and the motor is mounted on a bracket attached to the support members for selective assembly thereon between operating and shipping positions.

U.S. Pat. No. 4,676,473, issued to W. E. Giles on June 30, 1987, discloses a compressor mounting system that includes a bracket, a plurality of legs secured to the compressor and to the housing, and a pin extending from the compressor and which passes through a hole in a mounting plate secured to the housing. The bracket is formed from two arcuate segments that form a ring surrounding the compressor.

SUMMARY OF THE INVENTION

The present invention is directed to motor mounting means and more particularly to a motor mounting bracket. The bracket is of unitary construction and provides an enclosure that is formed to receive the mounting flange of the motor and to substantially enclose the motor.

The bracket is generally square in shape and includes four sides of a depth to substantially cover the motor and to protect same in the printer. The bracket has integral or built-in means for positioning and securing the motor. While such positioning and securing means is preferably made of plastic in a molding operation, it is, of course, optional to make the part or parts of sheet metal by means of a stamping operation.

The plastic bracket includes at least two snap fingers at each of opposite corners of the bracket which is formed to have openings on either side of each of the fingers. The motor is inserted into the bracket in an axial direction so that the motor mounting flange engages and deflects the snap fingers outwardly until the flange is received by the tips of the fingers. The fingers snap back into normal position and the flange is secured by at least two spring members that apply a force in a direction opposite the direction of insertion of the motor. The spring members keep the mounting flange seated against the snap fingers which eliminates any axial movement between the motor and the bracket. A pair of locating studs are provided to serve as installation guides and to prevent the motor mounting flange from moving in a rotational direction relative to the bracket.

In view of the above discussion, a principal object of the present invention is to provide positioning and securing means for an electrical motor or other electromechanical or mechanical component.

Another object of the present invention is to provide a mounting bracket for a small motor having a mounting flange secured to the motor.

An additional object of the present invention is to provide a mounting bracket for an electric motor wherein the bracket includes at least two fingers as an integral part of the bracket for clamping a mounting flange of the motor.

A further object of the present invention is to provide a frame portion of a printer that forms a mounting bracket for a small electric motor wherein the bracket has spring members which clamp the motor mounting flange and has locating studs for positioning the flange.

Additional advantages and features of the present invention will become apparent and fully understood from a reading of the following description taken together with the annexed drawing.

BRIEF DESCRIPTION OF THE DRAWING

FIG. 4 is a side elevational view of the printer frame member taken in the direction opposite from FIG. 1;

FIG. 5 is a view taken on the line 5—5 of FIG. 4; and

DESCRIPTION OF THE PREFERRED EMBODIMENT

Figure 1:
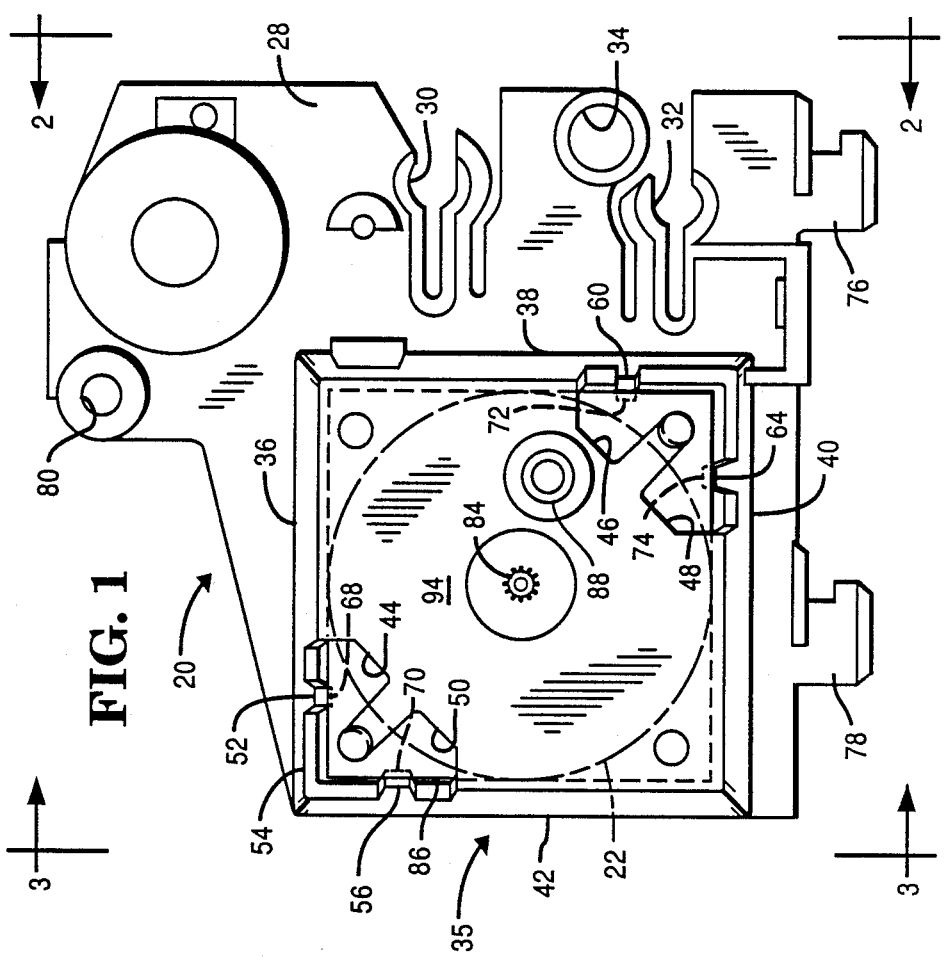
FIG. 1 is a side elevational view of a printer frame member incorporating the structure of the present invention.
Figure 6:
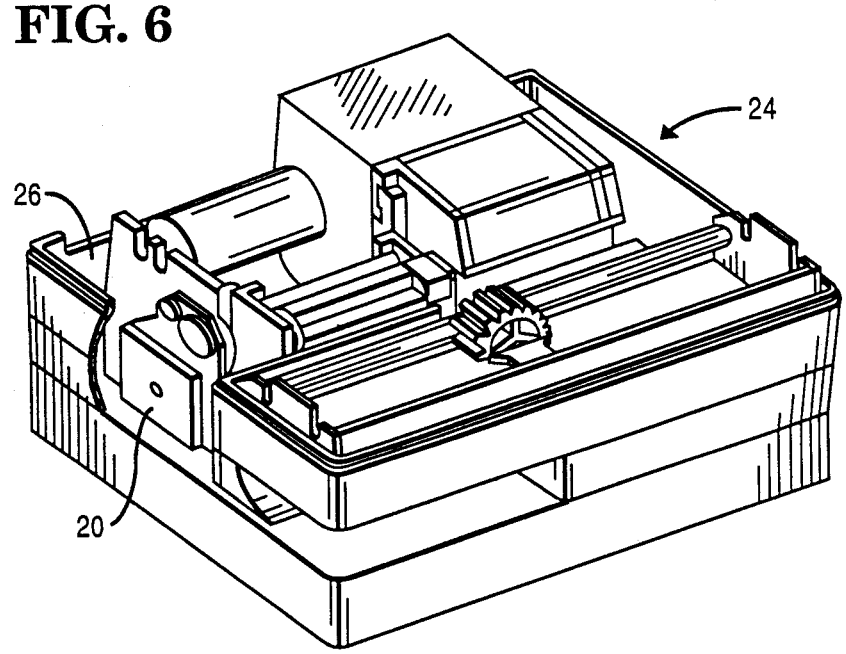
FIG. 6 is a perspective view of a printer showing the motor mounting arrangement.

FIG. 1 is a side elevational view of a frame member 20 which provides the means for mounting a circular-shaped electric motor 22 in a printer 24, as illustrated in FIG. 6. The frame member 20 is of unitary construction and preferably is made of plastic in a molding operation. A preferred material for the member 20 is polycarbonate with 15% PTFE (polytetrafluoroethylene) and 15% carbon fiber to provide for electrostatic discharge grounding. Another material that may be used is polycarbonate with 15% PTFE and 20% glass fiber. The member 20 is a portion of the printer and is located in a left hand cavity 26 of the printer 24 and provides support and bearing means for other parts or elements of the printer.

The frame member 20 includes a plate portion 28 having a bearing opening 30 for a shaft (not shown) that is used to support a paper drive roller. A second bearing opening 32 is provided for a shaft (also not shown) that is used to support a camming roller. A third bearing 34 is provided in the plate portion 28 to support a pivot shaft (also not shown). The orientation and mechanism of the structure associated with the bearings 30, 32 and 34 are fully described in copending application Ser. No. 67,757, filed June 29, 1987. The plate portion 28 provides supporting structure for record media thickness compensating mechanism which is described in the above-noted application.

The frame member 20 is formed to provide an enclosure-type configuration, as 35, of generally square shape that includes walls 36, 38, 40 and 42. The walls 36, 38, 40 and 42 extend in an outward direction from the plate portion 28. The top wall 36 and the bottom wall 40 are essentially the same form, and the right hand wall 38 and the left hand wall 42 are essentially the same form. The lower right hand corner and the upper left hand corner of the enclosure 35 are provided with cutout portions, as 44 in wall 36, as 46 in wall 38, as 48 in wall 40, and as 50 in wall 42. The cutout portions 46 and 48 bridge the walls 38 and 40, and the cutout portions 44 and 50 bridge the walls 36 and 42. The wall 36 includes a finger 52 extending outwardly from a narrow portion 54 of the wall 36, and the wall 42 includes a like-formed finger 56 extending outwardly from a narrow portion 58 of the wall 42. Likewise, the wall 38 includes a finger 60 extending outwardly from a narrow portion 62 of the wall 38, and the wall 40 includes a like-formed finger 64 extending outwardly from a narrow portion 66 of the wall 40. The fingers 52, 56, 60 and 64 are formed to incline slightly at an angle with respect to the walls so as to have the tip portions 68, 70, 72 and 74 positioned inwardly from the respective walls 36, 42, 38 and 40.

A pair of spaced lugs 76 and 78 are provided at the bottom of the frame member 20 to secure the member to the printer 24, and a bearing 80 is provided at the top of the member for a shaft (not shown) that is used to support the frame member 20 to other parts of the printer. An opening 82 is provided in the center of the enclosure 35 for the shaft 84 of the motor 22. A journal 88 is provided adjacent the shaft 84 as an integral part of the frame member 20 for accommodating a driven member (not shown).

Figure 3:
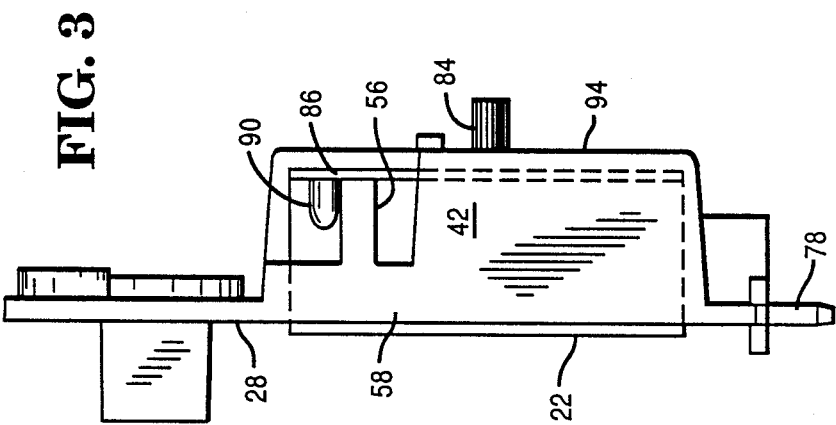
FIG. 3 is a view taken on the line 3—3 of FIG. 1.
Figure 2:
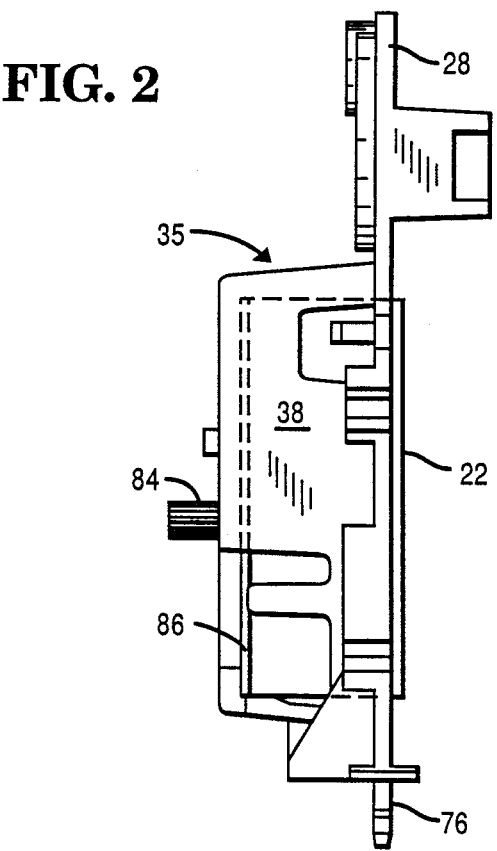
FIG. 2 is a view taken on the line 2—2 of FIG. 1.

The motor 22 is inserted in an axial direction from the left in FIG. 3 and the motor mounting flange 86 bears against the fingers 52, 56, 60 and 64, and deflects the fingers outwardly from the center of the enclosure 35. A pair of pilot studs 90 and 92 are provided as an integral part of the floor portion 94 of the enclosure 35. The motor mounting flange 86 has a pair of apertures 96 and 98 for receiving the pilot studs 90 and 92 as the motor 22 is installed into the housing 35. The tips 68, 70, 72 and 74 of the respective fingers 52, 56, 60 and 64 capture the edges of the motor mounting flange 86 and secure the motor 22 in place by snap action of the fingers in a direction back to their normal unrestrained position. This structure and positioning of the parts eliminates any axial play between the motor 22 and the frame member 20 which may be caused by any clearance between the motor flange 86 and the snap fingers 52, 56, 60 and 64.

It is thus seen that herein shown and described is a motor mounting bracket for use in a printer. The bracket has a plurality of snap fingers that are engageable by the motor mounting flange and are biased upon insertion of the motor. The mechanism and arrangement of the present invention enable the accomplishment of the objects and advantages mentioned above, and while a preferred embodiment has been disclosed herein, variations thereof may occur to those skilled in the art. It is contemplated that all such variations and modifications not departing from the spirit and scope of the invention hereof are to be construed in accordance with the following claims.

What is claimed is:

1. Apparatus for securing a electric motor to the frame of a printer, the motor including a drive shaft and a mounting flange fixed to the motor, said apparatus comprising a
    frame member of unitary construction including a plate portion having bearing means for supporting the frame member from the printer, a
    housing portion integrally formed with the plate portion and of a shape to receive the mounting flange and to provide a surface therefor, said housing portion including pilot means for receiving the mounting flange of the motor and said housing portion having inwardly inclined walls for substantially enclosing the motor, and a
    plurality of oppositely positioned fingers integrally formed with and cut out of the walls of the housing portion, said fingers being sprung outwardly during insertion of the motor into the housing portion by engagement with said mounting flange, said fingers returning to original position after passage of said mounting flange and engaging a surface of the mounting flange to retain the motor in the housing portion.

2. The apparatus of claim 1 wherein the housing portion is substantially square in shape and defines cutout portions at opposite corners thereof.

3. The apparatus of claim 1 wherein the frame ember includes a pair of spaced lugs integrally formed with the plate portion and positioned in spaced relationship from the bearing means for supporting the frame member from the printer.

4. The apparatus of claim 2 wherein the cutout portions bridge adjacent walls of the housing portion and the fingers are disposed in such adjacent walls.

5. The apparatus of claim 1 wherein said housing portion includes a journal member adjacent the drive shaft of said motor.

6. In an arrangement for securing an electric motor to the frame of a printer, the motor including a drive shaft extending from one end thereof and a mounting flange surrounding the drive shaft and fixed to the motor, the improvement comprising a
    frame member of unitary construction and including a plate portion, a
    housing portion integrally formed with the plate portion and of a shape to receive the mounting flange and to provide a surface against which the mounting flange is secured, said housing portion including pilot means for receiving the mounting flange of the motor and said housing portion having walls formed together for substantially enclosing the motor, and a
    plurality of oppositely positioned fingers integrally formed with and cut out of the walls of the housing portion and inclined inwardly from said walls, said fingers being sprung outwardly during insertion of the motor into the housing portion by engagement with said mounting flange, said fingers returning to original position after passage of said mounting flange and engaging a surface of the mounting flange to retain the motor in the housing portion.

7. In the arrangement of claim 6 wherein the housing portion is substantially square in shape and defines cutout portions at opposite corners thereof.

8. In the arrangement of claim 7 wherein the cutout portions bridge adjacent walls of the housing portion and the fingers are disposed in such adjacent walls.

9. In arrangement of claim 6 wherein said plate portion includes a pair of spaced lugs integrally formed therewith and includes bearing means spaced from the lugs for supporting the frame member from the printer.

10. In the arrangement of claim 6 wherein the frame member is molded of polycarbonate material with polytetrafluoroethylene and carbon fiber material.

11. A mounting assembly for securing an electric motor to the frame of a printer, the motor having a mounting flange fixed thereto and a drive shaft extending from one end of the motor and through the mounting flange, said mounting assembly comprising a
    frame member of unitary construction and including a plate portion having spaced bearing means for supporting the frame member from the printer, a
    housing portion integrally formed with the plate portion and extending in one direction outwardly therefrom, said housing portion being of a shape to receive the mounting flange of the motor and having an inside surface against which the mounting flange is seated, said housing portion including pilot means for receiving the mounting flange of the motor and said housing portion having walls for substantially enclosing the motor, said walls being formed at an angle with respect to the plate portion, and a
    plurality of oppositely positioned fingers integrally formed with and cut out of the walls of the housing portion and inclined inwardly therefrom, said fingers being sprung outwardly during insertion of the motor into the housing portion by engagement with said mounting flange, said fingers returning to original position after passage of said mounting flange and engaging a surface of the mounting flange to retain the motor in the housing portion.

12. The mounting assembly of claim 11 wherein the housing portion is substantially square in shape and defines cutout portions at opposite corners thereof.

13. The mounting assembly of claim 12 wherein the cutout portions bridge adjacent walls of the housing portion and said fingers are disposed in such adjacent walls.

14. The mounting assembly of claim 11 wherein the frame member is molded of polycarbonate resin with polytetrafluoroethylene and carbon fiber material.

15. The mounting assembly of claim 11 wherein the housing portion pilot means includes a pair of pilot members and the mounting flange includes a pair of apertures therein for receiving the pilot members.

16. The mounting assembly of claim 11 wherein the frame member is molded of polycarbonate resin with polytetraflouroethylene and glass fiber material.

17. Apparatus for securing an electric motor to the frame of a printer, the motor including a drive shaft and a mounting flange fixed to the motor, said apparatus comprising a
    frame member of unitary construction including a plate portion having bearing means for supporting the frame member from the printer, a
    housing portion integrally formed with the plate portion and of a shape to receive the mounting flange and to provide a surface therefor, said housing portion including a pair of pilot members and the mounting flange including a pair of apertures therein for receiving the pilot members, said housing portion having inwardly inclined walls for substantially enclosing the motor, and a
    plurality of oppositely positioned fingers integrally formed with and cut out of the walls of the housing portion, said fingers being sprung outwardly during insertion of the motor into the housing portion by engagement with said flange, said fingers returning to original position after passage of said flange and engaging a surface of the flange to retain the motor in the housing portion.

18. Apparatus for securing an electric motor to the frame of a printer, the motor including a drive shaft and a mounting flange fixed to the motor, said apparatus comprising a
    frame member of unitary construction including a plate portion having bearing means for supporting the frame member from the printer, said frame member including a pair of spaced lugs integrally formed with the plate portion and positioned in spaced relationship from the bearing means for supporting the frame member from the printer, a
    housing portion integrally formed with the plate portion and of a shape to receive the mounting flange and to provide a surface therefor, said housing portion having inwardly inclined walls for substantially enclosing the motor, and a
    plurality of oppositely positioned fingers integrally formed with and cut out of the walls of the housing portion, said fingers being sprung outwardly during insertion of the motor into the housing portion by engagement with said flange, said fingers returning to original position after passage of said flange and engaging a surface of the flange to retain the motor in the housing portion.

19. Apparatus for securing an electric motor to the frame of a printer, the motor including a drive shaft and a mounting flange fixed to the motor, said apparatus comprising a
    frame member of unitary construction including a plate portion having bearing means for supporting the frame member from the printer, a
    housing portion integrally formed with the plate portion and substantially square in shape to receive the mounting flange and to provide a surface therefor, said housing portion defining cut out portions at opposite corners thereof and having inwardly inclined walls for substantially enclosing the motor, said cut out portions bridging adjacent walls of the housing portion, and a
    plurality of oppositely positioned fingers integrally formed with and cut out of the walls of the housing portion, said fingers being sprung outwardly during insertion of the motor into the housing portion by engagement with said flange, said fingers returning to original position after passage of said flange and engaging a surface of the flange to retain the motor in the housing portion.

20. Apparatus for securing an electric motor to the frame of a printer, the motor including a drive shaft and a mounting flange fixed to the motor, said apparatus comprising a
    frame member of unitary construction including a plate portion having bearing means for supporting the frame member from the printer, a
    housing portion integrally formed with the plate portion and of a shape to receive the mounting flange and to provide a surface therefor, said housing portion having inwardly inclined walls for substantially enclosing the motor and including a journal member adjacent the drive shaft of the motor, and a
    plurality of oppositely positioned fingers integrally formed with and cut out of the walls of the housing portion, said fingers being sprung outwardly during insertion of the motor into the housing portion by engagement with said flange, said fingers returning to original position after passage of said flange and engaging a surface of the flange to retain the motor in the housing portion.

21. In an arrangement for securing an electric motor to the frame of a printer, the motor including a drive shaft extending from one end thereof and a mounting flange surrounding the drive shaft and fixed to the motor, the improvement comprising a
    frame member of unitary construction and including a plate portion, a
    housing portion integrally formed with the plate and of a shape to receive the mounting flange and to provide a surface against which the mounting flange is secured, said housing portion including a pair of pilot members and the mounting flange including a pair of apertures therein for receiving the pilot members, said housing portion having walls formed together for substantially enclosing the motor, and a
    plurality of oppositely positioned fingers integrally formed with and cut out of the walls of the housing portion and inclined inwardly from said walls, said fingers being sprung outwardly during insertion of the motor into the housing portion by engagement with said mounting flange, said fingers returning to original position after passage of said mounting flange and engaging a surface of the mounting flange to retain the motor in the housing portion.

22. In an arrangement for securing an electric motor to the frame of a printer, the motor including a drive shaft extending from one end thereof and a mounting flange surrounding the drive shaft and fixed to the motor, the improvement comprising a frame member of unitary construction and including a plate portion having a pair of spaced lugs integrally formed therewith and including bearing means spaced from the lugs for supporting the frame member from the printer, a housing portion integrally formed with the plate portion and of a shape to receive the mounting flange and to provide a surface against which the mounting flange is secured, said housing portion having walls formed together for substantially enclosing the motor, and a plurality of oppositely positioned fingers integrally formed with and cut out of the walls of the housing portion and inclined inwardly from said walls, said fingers being sprung outwardly during insertion of the motor into the housing portion by engagement with said mounting flange, said fingers returning to original position after passage of said mounting flange and engaging a surface of the mounting flange to retain the motor in the housing portion.

23. In an arrangement for securing an electric motor to the frame of a printer, the motor including a drive shaft extending from one end thereof and a mounting flange surrounding the drive shaft and fixed to the motor, the improvement comprising a frame member of unitary construction and including a plate portion, a housing portion integrally formed with the plate portion and substantially square in shape to receive the mounting flange and to provide a surface against which the mounting flange is secured, said housing portion defining cut out portions at opposite corners thereof and having walls formed together for substantially enclosing the motor, said cut out portions bridging adjacent walls of the housing portion, and a plurality of oppositely positioned fingers integrally formed with and cut out of the walls of the housing portion and inclined inwardly from said walls, said fingers being sprung outwardly during insertion of the motor into the housing portion by engagement with said mounting flange, said fingers returning to original position after passage of said mounting flange and engaging a surface of the mounting flange to retain the motor in the housing portion.

24. A mounting assembly for securing an electric motor to the frame of a printer, the motor having a mounting flange fixed thereto and a drive shaft extending from one end of the motor and through the mounting flange, said mounting assembly comprising a frame member of unitary construction and including a plate portion having spaced bearing means for supporting the frame member from the printer, a housing portion integrally formed with the plate portion and extending in one direction outwardly therefrom, said housing portion being of a shape to receive the mounting flange of the motor and having an inside surface against which the mounting flange is seated, said housing portion having walls for substantially enclosing the motor and said walls being formed at an angle with respect to the plate portion, said housing portion defining cut out portions bridging adjacent walls, and a plurality of oppositely positioned fingers integrally formed with and cut out of the adjacent walls of the housing portion and inclined inwardly therefrom, said fingers being sprung outwardly during insertion of the motor into the housing portion by engagement with said mounting flange, said fingers returning to original position after passage of said mounting flange and engaging a surface of the mounting flange to retain the motor in the housing portion.

25. A mounting assembly for securing an electric motor to the frame of a printer, the motor having a mounting flange fixed thereto and a drive shaft extending from one end of the motor and through the mounting flange, said mounting assembly comprising a frame member of unitary construction and including a plate portion having spaced bearing means for supporting the frame member from the printer, a housing portion integrally formed with the plate portion and extending in one direction outwardly therefrom, said housing portion being substantially square in shape to receive the mounting flange of the motor and having an inside surface against which the mounting flange is seated, said housing portion having walls for substantially enclosing the motor and said walls being formed at an angle with respect to the plate portion, said housing portion defining cut out portions bridging adjacent walls, and a plurality of oppositely positioned fingers integrally formed with and cut out of the adjacent walls of the housing portion and inclined inwardly therefrom, said fingers being sprung outwardly during insertion of the motor into the housing portion by engagement with said flange, said fingers returning to original position after passage of said flange and engaging a surface of the flange to retain the motor in the housing portion.

* * * * *

UNITED STATES PATENT AND TRADEMARK OFFICE
CERTIFICATE OF CORRECTION

PATENT NO.  : 4,832,306
DATED       : May 23, 1989
INVENTOR(S) : Thomas J. Bossack It is certified that error appears in the above-identified patent and that said Letters Patent is hereby corrected as shown below:

Column 5, line 37, "a" should be --an--.

Column 5, line 64, "ember" should be --member--.

Column 6, line 37, after "In", insert the word --the--.

Column 8, line 53, after "plate" insert --portion--.

Signed and Sealed this

Twentieth Day of March, 1990

Attest:

JEFFREY M. SAMUELS

Attesting Officer

Acting Commissioner of Patents and Trademarks